United States Patent [19]

Wrasidlo

[11] 4,005,012
[45] Jan. 25, 1977

[54] SEMIPERMEABLE MEMBRANES AND THE METHOD FOR THE PREPARATION THEREOF

[75] Inventor: Wolfgang J. Wrasidlo, La Mesa, Calif.

[73] Assignee: The United States of America as represented by the Secretary of the Interior, Washington, D.C.

[22] Filed: Sept. 22, 1975

[21] Appl. No.: 615,252

[52] U.S. Cl. .................... 210/23 H; 210/500 M
[51] Int. Cl.² .................... B01D 13/04
[58] Field of Search ........... 210/500 M, 490, 23 H; 260/2 A, 2.1 R, 857 R, 858

[56] References Cited
UNITED STATES PATENTS 3,642,663  2/1972  Greer ................ 260/2.1 R X
3,755,207  9/1973  Karatsu .............. 260/2 A
3,803,237  4/1974  Lednicer et al. ...... 260/2.1 R X Primary Examiner—Frank A. Spear, Jr.
Assistant Examiner—E. Rollins Cross
Attorney, Agent, or Firm—William S. Brown; Donald R. Fraser

[57] ABSTRACT

Semipermeable membranes which are useful in reverse osmosis processes are prepared by forming a polymeric ultra-thin film which possesses semipermeable properties on a microporous support. An example of the composite semipermeable membrane comprising an ultra-thin film formed by contacting an amine modified polyepihalohydrin with a polyfunctional agent and depositing this film on one surface of a microporous substrate.

7 Claims, No Drawings

SEMIPERMEABLE MEMBRANES AND THE METHOD FOR THE PREPARATION THEREOF

BACKGROUND OF THE INVENTION

In recent years reverse osmosis has attracted a great deal of interest for utilization in fields involving purification of liquids. This is of especial importance when utilizing this system in the purification of water and especially saline water. Likewise, the process is also used to remove impurities from liquids such as water or, in the field of dialysis, blood. When utilizing reverse osmosis in the purification of a saline water a pressure in excess of the osmotic pressure of the saline water feed solution is applied to the solution which is prepared from purified water by the semipermeable membrane. Pure water thereby diffuses through the membrane while the sodium chloride molecules or other impurities which may be present in the water are retained by the membrane. Discussions and descriptions of such treatment in general and the state of the art in the middle 1960's is set forth in the treatise Desalinization by Reverse Osmosis, the M.I.T. Press, 1966, which was edited by Ulrich Merten.

Various semipermeable membranes are now being used in commercial processes for performing separations by the reverse osmosis treatment of aqueous solutions either for the portion of relatively pure water or for concentration of a liquid solution being treated or both. Such semipermeable membranes which are being used commercially include the early Loeb-type membranes made of cellulose diacetate by processes described in U.S. Pat. Nos. 3,133,132 and 3,133,137. The Loeb-type membranes comprising the asymmetric type which are characterized by a very thin, dense surface layer or skin that is supported upon an integrally attached, much thicker supporting layer. Other types of semipermeable membranes which are also in use include membranes having been fabricated from polyamides, polyimides, polyphenyl esters, polysulfonamides, polybenzimidazole, polyarylene oxides, polyvinylmethyl ether and other polymeric organic materials.

In a latter development processes have been utilized for preparing an ultra-thin film or skin separately from a porous supporting layer, and membranes which have been prepared in such a manner have become known as composite membranes. When preparing such a type of membrane, it is possible to tailor both the ultra-thin film and the porous supporting layer in such a manner so that each of the components will possess the most desirable properties.

The book Condensation Polymers by Paul W. Morgan, Intersciences Publishers, 1965, teaches interfacial condensation as one method of making a thin film polymer from reacting monomers. This type of condensation provides one process for making reverse osmosis membranes of the composite type, particular examples of which are set forth in U.S. Pat. No. 3,744,642.

When utilizing the semipermeable membranes in the treatment of brackish water, and particularly in the treatment of waste effluent, it is often necessary to treat the feed material with chlorine or other oxidizing agents so as to guard against bacterial growth which could greatly deter the performance of the membranes as a result of fouling or the like. However, it has also been found that when chlorine has been included in the feed to which the semipermeable membranes are exposed, there is a substantial deterioration in the performance of the membrane. Inasmuch as this deficiency of chemical degradation results in too short a useful life with the accompanying too low salt rejection which results in an inefficient operation, it is desired that composite semipermeable membranes be prepared which will possess desirable characteristics of an increased resistance to fouling and/or deterioration. As will be hereinafter set forth in greater detail, composite semipermeable membranes which are prepared according to the process of this invention will be found to possess these desirable characteristics.

This invention relates to semipermeable membranes and to a method for the preparation thereof. More specifically, the invention is concerned with semipermeable membranes which are useful in reverse osmosis or ultra-filtration processes which possess desirable characteristics of being resistant to deterioration due to the presence of chlorine in the feed fluid.

It is therefore an object of this invention to provide improved composite semipermeable membranes which are useful in the treatment of chlorine-containing fluids.

Another object of this invention is to provide a method for the preparation of composite semipermeable membranes which possess the desirable characteristics of providing good salt rejection, high flux rates, and are resistant to deterioration when utilized with a chlorine-treated feed.

In one aspect an embodiment of this invention resides in a composite semipermeable membrane which comprises a microporous substrate and an ultra-thin film having semipermeable properties deposited on one surface of said microporous substrate, said ultra-thin film being formed by contacting an aqueous solution of an amine modified polyepihalohydrin with a solution of a polyfunctional agent which is capable of reacting with the amine groups of said amine modified polyepihalohydrin.

Another embodiment of this invention is found in a method of preparing a composite semipermeable membrane which comprises the steps of: (a) treating a microporous substrate with an aqueous solution of an amine modified polyepihalohydrin, (b) contacting the resultant coated microporous substrate with a solution of polyfunctional agent capable of reacting with the amine groups of said amine modified polyepihalohydrin to form an ultra-thin film on one surface of said microporous support, and (c) drying said composite semipermeable membrane at an elevated temperature.

A specific embodiment of this invention is found in a composite semipermeable membrane which comprises a microporous substrate consisting of polysulfone and an ultra-thin film having semipermeable properties deposited on one surface of said polysulfone, said ultra-thin film having been formed by contacting an aqueous solution of polyepichlorohydrin which has been modified by treating with ethylene diamine with a solution of isophthaloyl chloride, said isophthaloyl chloride being capable of reacting with the amine groups of the amine modified polyepichlorohydrin.

Another specific embodiment of this invention is found in a method for preparing a composite semipermeable membrane which comprises the steps of treating a polysulfone with an aqueous solution of a polyepichlorohydrin which has been modified by treatment with ethylene diamine, contacting with resultant coated polysulfone with a solution of isophthaloyl chloride in hexane, and drying the resultant composite semipermeable membrane at a temperature in the range of from about 80° to about 125° C.

Other objects and embodiments will be found in the following further detailed description of the present invention.

As hereinbefore set forth, the present invention is concerned with improved composite semipermeable membranes and to a method for the preparation thereof. Prior art ultra-thin films which are utilized for semipermeable membranes have been prepared by reacting various monomers in order to form a crosslinked polymer. For example, monomers containing imine functions, amine functions or hydroxyl groups, etc., may be crosslinked utilizing various functional groups such as anhydrides, olefins, etc. However, it has now been discovered that by contacting a polyepihalohydrin, which has been modified by treatment with an amine compound, with polyfunctional agents which are capable of reacting with the amine groups of the modified polyepihalohydrin, it is possible to prepare an ultra-thin film which possesses a different generic structure than that of the films hereinbefore prepared. The ultra-thin film which is prepared according to the process of the present invention will possess only ethylene oxide units in the main chain of the polymer, while all of the reactive groups in the side chain of the amine modified polyepihalohydrin will act as cross-linking agents. The aforementioned condensation reaction between the polyfunctional agent of a type hereinafter set forth in greater detail and the amine modified polyepihalohydrin may be exemplified by the following reaction:

rous substrate may be cast from homopolymers or from mixed polymers of cellulose acetate, cellulose nitrate, cellulose butyrate, polysulfone, polystyrene, etc. The preparation of these support materials has been described in various pieces of literature and are well known in the art. For example, polysulfone which may be utilized as a microporous substrate in the preparation of the composite semipermeable membrane of the present invention may be prepared by casting a solution of polysulfone in dimethylformamide on a glass plate, followed by immersion in either water or a 2 wt. % aqueous dimethylformamide solution to gel the film. The side of the polysulfone foam which is exposed to air during the casting is known as the "face" and will contain very small pores, mostly under 100 Angstroms in diameter as opposed to the "back" of the film which is in contact with the glass plate and which will possess very coarse pores. While the above discussion has enumerated several types of microporous substrates which may be utilized, it is to be understood that these substrates are only representative of the class of microporous compounds which may be used and that the present invention is not necessarily limited thereto.

The polyepihalohydrins which may be modified by the addition of an amine compound will preferably comprise epichlorohydrin or epibromohydrin although other epihalohydrins such as 1,2-epoxy-4-chlorobutane, 2,3-epoxy-4-chlorobutane, 1,2-epoxy-5-chloropentane, 2,3-epoxy-5-chloropentane, 1,2-epoxy-4-bromobutane, 2,3-epoxy-4-bromobutane, 1,2-epoxy-5-bromobutane, 2,3-epoxy-5-bromobutane, etc. may also be used. It is also contemplated that while the chloro

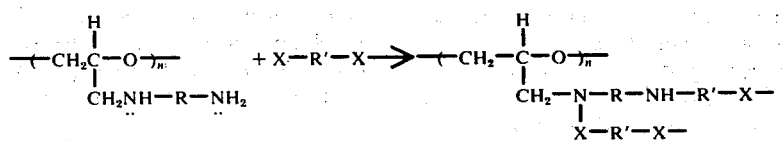

In the above formulas R may comprise an aliphatic hydrocarbon containing from 2 to about 10 carbon atoms, an alicyclic hydrocarbon containing from about 4 to about 8 carbon atoms in the ring or a heterocyclic radical, R' may be selected from the group consisting of R or aromatic hydrocarbons, X is the chloride of a mono- or dibasic acid containing from 1 to about 20 carbon atoms, an anhydride of a mono- or dibasic acid containing from 1 to about 20 carbon atoms, a diisocyanate, dithiodiisocyanate, a chloroformate or a mono- or dibasic sulfonyl chloride and n is a number of from 1 to about 20,000.

The desired composite semipermeable membrane may be prepared by coating a suitable substrate comprising a microporous compound per se or a microporous substrate which has been reinforced by the addition of a backing such as, for example, a fabric. The microporous substrates which may have the ultra-thin film formed on one surface thereof may comprise a composition in which the pores in the surface of the microporous substrate are preferably sized between 100 Angstroms and about 1,000 Angstroms although it is contemplated within the scope of this invention that the surface pores may also range in size between about 50 Angstroms and about 5,000 Angstroms. The aforementioned microporous substrate may be selected from the various commercially available materials such as Millipore filters (types VS and VM) or the micropoderivatives are preferred, it is also possible to employ bromo and iodo compounds as well. The aforementioned polyepihalohydrin compounds are modified by treatment with an amine compound. Suitable amine compounds which may be employed to modify the aforementioned polyepihalohydrins will include polyamino compounds such as ethylene diamine, diaminopropane, diaminobutane, diaminopentane, diaminohexane, diaminoheptane, diaminooctane, diaminononane, diaminodecane, diethylene triamine, dipropylene triamine, dibutylene triamine, triethylene tetramine, tripropylene tetramine, tributylene tetramine, tetraethylene pentamine, pentaethylene hexamine, etc., the isomeric diaminocyclobutanes, diaminocyclopentanes, diaminocyclohexanes, diaminocycloheptanes, diaminocyclooctanes, etc., the isomeric diaminofurans, diaminothiofurans, diaminopyrroles, diaminopyrans, diaminothiapyrans, diaminopyridines, etc.

The aforementioned amine modified polyepihalohydrins are utilized in an aqueous solution to form a wet continuous film on the surface of the microporous substrate of the type hereinbefore set forth in greater detail. This formation of wet continuous film is accomplished but not limited to the soaking of the aforementioned microporous support in the aqueous solution for a period of time which may range from about 0.5 up to about 20 hours or more in duration. The amine modified polyepihalohydrin is present in the aqueous solution in an amount in the range of from about 1% to about 10% or more by weight of the solution. Following the soaking of the support in the aqueous solution for the predetermined period of time, the support is then continuously removed from the bath at a constant speed and dried for a period of time ranging from about 2 to about 30 minutes. Upon completion of the drying step, the surface of the coated support is then contacted with an aqueous solution of the amine modified polyepihalohydrin in which the aforementioned polyepihalohydrin is present in an amount in a range of from about 0.5 to about 20% by weight. Following this, the coated support is then contacted with a solution of the polyfunctional agent which is capable of reacting with the amine group of the amine modified polyepihalohydrin, the substrate for the polyfunctional group comprising a solvent which is substantially immiscible with the aqueous substrate of the amine modified polyepihalohydrin solution. Examples of polyfunctional agents which may be employed to react with the amine modified polyepihalohydrin are selected from the group consisting of mono- and dibasic acid chlorides, both saturated and unsaturated in nature, in which the carbon chain will range from about 1 to about 20 carbon atoms, acid anhydrides in which the carbon chain of the carboxylic acid will contain from 1 to about 20 carbon atoms, aliphatic and aromatic diisocyanates, thioisocyanates, chloroformates, and sulfonyl chlorides.

Some specific examples of these compounds will include the acid chlorides such as formyl chloride, acetyl chloride, propionyl chloride, butyryl chloride, valeryl chloride, caproyl chloride, heptanoyl chloride, octanoyl chloride, pelargonyl chloride, capryl chloride, lauryl chloride, myristyl chloride, palmityl chloride, margaryl chloride, stearyl chloride, etc., oxalyl chloride, malonyl chloride, succinyl chloride, glutaryl chloride, fumaryl chloride, glutaconyl chloride, etc., acid anhydrides such as acetic anhydride, propionic anhydride, butyric anhydride, phthalic anhydride, etc., ethylene diisocyanate, propylene diisocyanate, benzene diisocyanate, toluene diisocyanate, naphthalene diisocyanate, methylene bis(4-phenylisocyanate), ethylene thioisocyanate, propylene thioisocyanate, benzene thioisocyanate, toluene thioisocyanate, naphthalene thioisocyanate, etc., ethylene bischloroformate, propylene bischloroformate, butylene bischloroformate, etc., 1,3-benzenedisulfonyl chloride, 1,4-benzenedisulfonyl chloride, 1,3-naphthalenedisulfonyl chloride, 1,4-naphthalenedisulfonyl chloride, etc. It is to be understood that the aforementioned polyfunctional agents are only representative of the class of compounds which may be used and that the present invention is not necessarily limited thereto.

After contacting the coated support with the polyfunctional agent to effect a cross-linking and formation of the resultant ultrathin film, the composite semipermeable membrane is then air dried for a period ranging from about 0.5 minutes to about 30 minutes. Thereafter the membrane is drawn through means at an elevated temperature which may range from about 25° to about 150° C. for a period of from about 10 minutes to about 30 minutes. Any suitable means may be utilized to effect the drying at the elevated temperature such as radiant gas heaters, infra-red lamps, ovens, etc.

It is also contemplated within the scope of this invention that the dried composite semipermeable membrane may be subjected to an additional step whereby a protective coating is placed on the surface of the ultra-thin film. The deposition of the protective coating on the surface of the ultra-thin film may be effected by coating said barrier film with a water soluble organic polymer. Examples of these water soluble organic polymers which may be used to form the protective coating will include such polymers as polyvinyl alcohol, polyvinyl pyrrolidone, polyacrylamide, polyacrylic acid, etc. In the preferred embodiment, the water soluble organic polymer is dissolved in an aqueous solution in an amount in the range of from about 1 to about 15% by weight of the solution. In one embodiment, the dried composite semipermeable membrane is continuously coated with this water soluble organic polymer solution by passing said composite semipermeable membrane through a bath of said solution or by applying the polymer solution to the surface of the barrier film by any means known in the art such as by dip coating, spraying, painting, etc., and thereafter drying the thus coated composite semipermeable membrane at an elevated temperature ranging from about 80° to about 100° C. for a relatively short period of time, i.e., from about 5 to about 10 minutes, in order to remove the water and thus present a finished product.

It is further contemplated within the scope of this invention that in the event an acid halide is utilized as a co-reactant in the cross-linking polymerization step of the present process, an acid acceptor should be present in the reaction mixture. The presence of the acid acceptor is due to the fact that hydrogen halide is produced as a side product in the polymerization reaction and therefore this hydrogen halide must be taken up in order that said polymerization reaction be effected at an economically feasible manner to produce substantial yields of the desired ultra-thin film. Examples of these hydrogen halide acceptors will include organic bases such as pyridine, ethyl amine, ethylene diamine, ethylene triamine, propyl amine, propylene diamine, propylene triamine, diethyl amine, triethyl amine, dipropyl amine, tripropyl amine, or an inorganic base compound such as sodium oxide, potassium oxide, lithium oxide, sodium carbonate, sodium bicarbonate, potassium carbonate, potassium bicarbonate, lithium carbonate, lithium bicarbonate, sodium acetate, potassium acetate, lithium acetate, sodium chloride, potassium chloride, lithium chloride, etc. The hydrogen halide acceptors may be added directly to the aqueous solution of the amine modified polyepihalohydrin prior to the interfacial condensation reaction or, if so desired, they may be added in a separate step at a period subsequent to the condensation reaction.

As will be hereinafter shown in the examples, the composite semipermeable membrane comprising an ultra-thin film composited on a microporous substrate which is covered by a protective coating will be an effective agent in a reverse osmosis unit, said membrane possessing the desirable characteristics of a good water flux, good salt rejection, and, in addition, will exhibit substantially improved resistance to liquid feeds which contain chlorine.

The following examples are given to illustrate the process of the present invention which, however, are not intended to limit the generally broad scope of the present invention in strict accordance therewith.

EXAMPLE I

To prepared a microporous substrate on which an ultra-thin film is to be placed, a tightly woven Dacron cloth was disposed on a glass plate. Thereafter a solution containing 12.5 wt. % polysulfone, 12.5 wt. % methyl cellusolve and the remainder dimethylformamide was cast in a layer of about 0.02 inch thick upon the cloth. The polysulfone layer was gelled in a room temperature water bath and the resultant fiber reinforced porous polysulfone substrate was recovered. The substrate had an overall thickness of about 0.06 inch with the portion of the porous polysulfone layer which lies atop the Dacron cloth having a thickness of about 0.025 inch. The polysulfone layer was examined and found to have a finely porous upper surface possessing numerous small pores which where between about 50 Angstroms and about 600 Angstroms in size. These pores are considered capable of supporting an ultra-thin semipermeable film without having the film collapse into the pores upon pressure.

The thus prepared fabric reinforced polysulfone substrate was thereafter soaked for a period of 16 hours in an aqueous bath which contained 5% of ethylene diamine modified polyepichlorohydrin and 2.5% sodium chloride. At the end of the 16-hour period, the substrate was continuously removed from the bath at a constant speed of 1 foot per minute. Following air drying for a period of about 10 minutes, the presoaked polysulfone substrate was disposed upon a glass plate and the plate mounted substrate was immersed again in a 10% aqueous solution of the ethylene diamine modified polyepichlorohydrin for a period of about 20 seconds in order to wet the previously dried upper surface. The rewetted membrane was allowed to drain for about 2 minutes and was thereafter immersed in a hexane solution which contained about 1.5 wt. % of isophthaloyl chloride. After remaining in this solution for a period of about 15 seconds, it was removed, drained and continuously withdrawn through an oven which had been preheated to a temperature of about 100° C. for a period of about 10 minutes. The dried membrane was then continuously coated with a 7% solution of polyvinyl alcohol in water and heated to a temperature of from 80° to 100° C. for a period of 5 minutes to thereby form a protective coating of the polyvinyl alcohol on the surface of the ultra-thin film.

Samples of the composite semipermeable membrane which were prepared according to this process were tested using a 3.5 wt. % aqueous solution of sodium chloride at 1000 psi., 25° C. and a pH in the range of from 5.6 to 6.0. These samples were found to initially exhibit a salt rejection ranging from about 98.2 to 99.5% and a water flux ranging from 25 to 35 gallons per square foot per day (GFD). Additional samples of the composite semipermeable membrane were tested using a 0.3 wt. % aqueous solution of sodium chloride at 600 psi., 25° C., and a pH of 5.6 to 6.0. These membranes were found to exhibit a salt rejection ranging from 97.5 to 99.5% and a water flux ranging from 40 to 70 GFD.

To illustrate the improved resistance of composite semipermeable membranes which are prepared according to the process of this invention to feeds containing chlorine, samples of these membranes were tested in comparison to other composite semipermeable membranes which were not prepared utilizing amine modified polyepichlorohydrins. The latter membranes were prepared by treating polyethylene imine with isophthaloyl chloride to form a cross-linked polymeric ultra-thin film on the fabric reinforced polysulfone substrate. The aforementioned tests were carried out by subjecting the membranes to a feed comprising a 3.5 wt. % aqueous solution of sodium chloride at 1000 psi., 25° C., and a pH of 5.6 to 6.0. The treatment of the two membranes was continued for a period of about 180 hours with readings being taken every 12 to 24 hours. The initial water flux of each of the membranes was about 25 GFD. The water flux of the composite semipermeable membrane of the present invention remained at about 25 GFD for the entire 180-hour period. In contradistinction to this, the water flux of the other membrane rose to about 27 GFD after about 50 hours, to about 32 GFD after 75 hours, to 35 GFD after about 100 hours and to about 44 GFD after about 135 hours.

Thereafter additional samples of both composite membranes were tested with about 3 ppm chlorine added to the feed supply and the readings were again taken periodically. The composite semipermeable membrane which was prepared according to the process of this invention exhibited only a very slight decline, that is, from an initial salt rejection of about 99.3% to about 99% at the end of about 175 hours. In contradistinction to this, the salt rejection of the membrane which was not prepared utilizing an amine modified polyepichlorohydrin decreased from an initial rejection of 99% to about 96% at the end of about 140 hours. It is therefore readily apparent that the membrane of the present invention which was prepared according to the process hereinbefore set forth is extremely well suited to be used in connection with a feed solution which contains an oxidizing component such as chlorine.

EXAMPLE II

In this example a microporous substrate is prepared by placing a Dacron cloth similar in nature to that set forth in Example I on a glass plate, after which a solution containing about 15 wt. % of cellulose acetate and the remainder dimethylformamide is cast in a layer of about 0.02 inch thick upon the cloth. The cellulose acetate layer is gelled and the resultant fiber reinforced porous cellulose acetate is recovered. The cellulose acetate will be found to possess a finely porous upper surface which possesses numerous small pores between about 50 Angstroms and about 600 Angstroms in size.

The fabric reinforced cellulose acetate substrate is then soaked for a period of 16 hours in an aqueous bath which contains about 5% of an ethylene diamine modified polyepichlorohydrin and 2.5% sodium chloride. At the end of the predetermined time period, the substrate is continuously removed from the bath and after being dried in air for a period of about 10 minutes, the substrate is then disposed on a glass plate and re-immersed in a 10% aqueous solution of ethylene diamine modified polyepichlorohydrin for a period of about 20 seconds in order to rewet the previously dried upper surface. After allowing the rewetted membrane to drain, it is then immersed in a hexane solution which contains about 2.0 wt. % of toluene diisocyanate. After allowing the substrate to remain in this solution for a period of about 15 seconds, it is then removed, drained and drawn through an oven which is maintained at a temperature of about 100° C. The thus dried and cross-linked membrane is then coated with a 7% solution of polyvinyl alcohol in water and heated to a temperature of about 100° C. for a period of 5 minutes, said polyvinyl alcohol thus forming a protective coating on the surface of the ultra-thin film.

When samples of this film are tested using a 3.5 wt. % aqueous solution of sodium chloride at a pressure of 1,000 psi. at a temperature of 25° C. while maintaining the pH in a range of from 5.6 to 6.0, it will be found that said samples will exhibit a salt rejection ranging above about 98% and a water flux which will range from about 25 to 35 GFD.

EXAMPLE III

In like manner an ultra-thin membrane is formed by treating a dacron cloth with a solution containing 12.5 wt. % polysulfone, 12.5 wt. % methyl cellusolve and dimethylformamide whereby a layer of about 0.02 inch thick is cast upon the Dacron cloth. The polysulfone layer is gelled in a room temperature water bath and the fiber reinforced porous polysulfone substrate is recovered. This substrate will have characteristics similar to those set forth in Example I above. Following this, the fabric reinforced polysulfone substrate is again disposed on a glass plate and the glass plate mounted substrate is immersed in an 10% aqueous solution of ethylene diamine modified polyepibromohydrin. The membrane is then recovered, allowed to drain for a period of about 2 minutes and is thereafter immersed in a hexane solution containing about 1.5 wt. % of acetic anhydride. After remaining in the acetic anhydride solution for a period of about 15 seconds, it is removed, drained and drawn through an oven which is maintained at a temperature of about 100° C. for a period of about 10 minutes. The dried membrane is then coated by passage through a 7% solution of polyvinyl alcohol in water and after being withdrawn from this solution, is heated to a temperature of from about 80° to 100° C. for a period of 5 minutes whereby a protective coating of polyvinyl alcohol is formed on the surface of the ultra-thin film.

When samples of this composite semipermeable membrane are tested by using a 3.5 wt. % aqueous solution of sodium chloride at a pressure of 600 psi., a temperature of 25° C. and a pH of from 5.6 to 6.0, it will be found that these membranes will exhibit a salt rejection above about 97% and a water flux which will range from about 40 to about 70 GFD.

I claim as my invention:

1. In a process for desalination of saline water by reverse osmosis comprising contacting the saline water under pressure with a reverse osmosis membrane, the improvement comprising using as the reverse osmosis membrane a composite semipermeable membrane prepared by a method comprising the steps of:
   a. treating a microporous substrate with an aqueous solution of an amine modified polyepihalohydrin,
   b. immersing the resultant coated microporous substrate in a solution of a polyfunctional agent capable of reacting with the amine groups of said amine modified polyepihalohydrin to form an ultra-thin film on one surface of said microporous support, and
   c. drying said composite semipermeable membrane at an elevated temperature.

2. The process of claim 1 in which preparation of the composite semipermeable membrane is further characterized in that said membrane is coated with a water soluble organic polymer and thereafter heated at an elevated temperature to form a protective coating on the surface of the membrane.

3. The process of claim 1 in which the polyepihalohydrin is polyepichlorohydrin.

4. The process of claim 1 in which the polyepihalohydrin is modified with ethylene diamine.

5. The process of claim 1 in which the polyfunctional agent is isophthaloyl chloride.

6. The process of claim 1 in which the composite semipermeable membrane is dried at a temperature of about 50° to 125° C.

7. The process of claim 2 in which the water soluble organic polymer is polyvinyl alcohol.

* * * * *